United States Patent
Ikegawa

(10) Patent No.: US 6,877,902 B2
(45) Date of Patent: Apr. 12, 2005

(54) HYDRODYNAMIC BEARING DEVICE

(75) Inventor: Taizou Ikegawa, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/343,183

(22) PCT Filed: May 23, 2002

(86) PCT No.: PCT/JP02/05028
§ 371 (c)(1),
(2), (4) Date: Jan. 28, 2003

PCT Pub. Date: Dec. 12, 2002

(65) Prior Publication Data

US 2003/0174917 A1 Sep. 18, 2003

(51) Int. Cl.[7] .............................................. F16C 17/02
(52) U.S. Cl. ..................................................... 384/114
(58) Field of Search ................................. 384/115, 114, 384/119, 120, 113

(56) References Cited

U.S. PATENT DOCUMENTS 5,370,463 A 12/1994 Asada et al.

FOREIGN PATENT DOCUMENTS

| JP | 58-109715 | 6/1983 |
|----|-----------|--------|
| JP | 58-179588 | 10/1983 |
| JP | 62-37511 | 2/1987 |
| JP | 63-92819 | 6/1988 |
| JP | 6-335366 | 12/1996 |

*Primary Examiner*—Lenard A. Footland
(74) *Attorney, Agent, or Firm*—Parkhurst & Wendel, L.L.P.

(57) ABSTRACT

A hydrodynamic bearing device in which an incline between the center line of a shaft and the center line of a sleeve can be eliminated, rotational precision improved, and NRRO reduced, characterized in that different bearing lengths (L1 and L2) are selected for radial bearing portions and that at least any one parameter selected from among groove depths of pressure generating grooves, groove angles formed between the grooves and the radial direction of an shaft, and groove width ratios [a/(a+b)] of groove width (a) in relation to the sum (a+b) of the groove width (a) and ridge width (b) is caused to vary among the plurality of radial bearing portions.

11 Claims, 4 Drawing Sheets

(a)

(b)

HYDRODYNAMIC BEARING DEVICE

TECHNICAL FIELD

The present invention relates to a hydrodynamic bearing device, and more particularly to a hydrodynamic bearing device that can be used as a spindle motor for a hard disk drive or the like which is required of especially high rotational precision.

BACKGROUND ART

The track density of magnetic disks has been increased in recent years in order to raise the recording density of hard disk drives. Higher recording density is required in disk drive spindle motors with such high track density. In particular, if non-repeatable runout (referred to hereinbelow as "NRRO") is large, off-track events during tracking will be created. Therefore, NRRO should be minimized. In view of this, spindle motors with hydrodynamic bearing devices were developed as motors in which high-speed rotation and reduced noise are ensured in addition to high rotational precision.

FIG. 5 depicts a conventional hard disk drive with a hydrodynamic bearing device.

The base end portion of a shaft 2 is fixedly press-fitted into a base 1 as the fixed side, and a thrust flange 3 is provided to the leading end portion of the shaft 2 to form a shaft unit 18, as shown in FIG. 5(a). A sleeve 5 is provided to the external peripheral portion of the shaft 2, and a thrust plate 4 is provided to the sleeve 5 in an opposing arrangement with the thrust flange 3 to form a sleeve unit 17.

Pressure generating grooves 15a and 15b are formed in the internal peripheral portion of the sleeve 5, and a pair of radial bearing portions 14a and 14b is formed as shown in FIG. 5(b). Pressure generating grooves (not shown) are also formed in both surfaces of the thrust flange 3, yielding a thrust bearing (not shown). The gap between the journal 18 and the sleeve unit 17 is filled with incompressible oil 16 to allow the sleeve unit 17 to be rotatably supported.

A coil 10 wound on a stator core 9 is mounted on a wall 1a provided to the external peripheral portion of the shaft 2. A hub 6 for mounting magnetic disks 13 is fixedly press-fitted around the outside of the sleeve 5, and a magnet 7 is mounted via a yoke 8 on the inside of the external peripheral portion of the hub 6 so as to face the stator core 9. A plurality of magnetic disks 13, which are mounted via a spacer 12 around the outside of the hub 6, is attached by the fastening force of a screw 19 via a clamp 11.

When the coil 10 is energized, an electric-current magnetic field is generated between the coil 10 and the magnet 7, the sleeve unit 17 is rotatably driven, lifting force is generated in the sleeve unit 17 by the pumping action of the radial bearing portions 14a and 14b and the pressure generating grooves formed in the thrust bearing portion, and the sleeve unit 17 is rotated without contact via the journal 18 and oil 16.

Runouts are induced in the magnetic disk device thus configured because the load applied to the radial bearing portions 14a and 14b during rotation varies depending on the formation position of the pair of radial bearing portions 14a and 14b formed around the inside of the sleeve 5, and on the center of gravity position of a rotating body that comprises the sleeve unit 17, the magnetic disks 13 mounted thereon, the spacer 12, the clamp 11, and the like.

In view of this, the assembly is commonly configured such that the length of the radial bearing portions 14a and 14b varies in the axial direction, as disclosed in Japanese Patent Application Laid-open H8-335366. The length of the radial bearing portions 14a and 14b in the axial direction will be referred to hereinbelow as "the bearing length." Specifically, adjustments are made such that the bearing length L1 of the radial bearing portion 14a formed on the side facing the leading end of the shaft 2 is greater than the bearing length L2 of the radial bearing portion 14b formed on the side facing the leading end portion of the shaft 2, balance is achieved between the bearing rigidity of the radial bearing portions 14a and 14b and the center of gravity position G, and runouts are reduced.

This structure does not present any problems in existing hard disk drives, but even higher rotational precision and lower NRRO will be required in the future as hard disk drives become more compact and are rotated at higher speeds. The following are believed to be the reasons for the occurrence of NRRO.

In the radial bearing portions 14a and 14b provided with different bearing lengths L1 and L2 in the above-described manner, the herringbone-shaped, pressure generating grooves 15a and 15b are designed such that the groove depths, groove angles, and groove width ratios are equal to each other. For this reason, eccentric angles, which are the angles between the forces exerted on the sleeve 5 by dynamic pressure and the position in which the gap between the external peripheral surface of the shaft 2 and the internal peripheral surface of the sleeve 5 during rotation is at its minimum, is such that the eccentric angle of the radial bearing portion 14a becomes greater than the eccentric angle of the radial bearing portion 14b. As a result, rotational precision is reduced and NRRO increased by rotation during which the center line of the shaft 2 and the center line of the sleeve 5 are inclined relative to each other.

DISCLOSURE OF THE INVENTION

An object of the present invention is to solve the aforementioned problems and to provide a hydrodynamic bearing device in which an incline between the center line of a shaft and the center line of a sleeve can be eliminated, rotational precision improved, and NRRO reduced.

The hydrodynamic bearing device according to the first aspect of the present invention is a hydrodynamic bearing device in which a fluid is interposed between a sleeve and a shaft, each one being supported to the other one in a rotatable fashion, pressure generating grooves formed at least on either of an external peripheral surface of the shaft or an internal peripheral surface of the sleeve, and a plurality of radial bearing portions having different bearing lengths in the axial direction, wherein at least any one selected from among a groove depth of the pressure generating grooves constituting the radial bearing portions, a groove angle formed between the grooves and the radial direction of the shaft, and a groove width ratio [a/(a+b)] constituting a ratio of a groove width a to a sum (a+b) of the groove width a and a ridge width b is caused to vary among the plurality of radial bearing portions.

The hydrodynamic bearing device according to the second aspect of the present invention is such that in the first aspect of the present invention, the groove depth of the radial bearing portion with a greater bearing length is greater than the groove depth of the radial bearing portion with a smaller bearing length.

With this structure, the groove depth, which is highly contributory to eccentric angles, can be varied so that even if the radial bearing portions differ greatly in bearing length, a substantially complete match can be readily established between the eccentric angles merely by slightly changing the groove depth.

The hydrodynamic bearing device according to the third aspect of the present invention is such that in the first aspect, the groove width ratio of the radial bearing portion with a greater bearing length is greater than the groove width ratio of the radial bearing portion with a smaller bearing length.

With this structure, the groove width ratio, which is highly contributory to the eccentric angle, can be varied so that even if the radial bearing portions differ greatly in bearing length, a substantially complete match can be readily established between the eccentric angles merely by slightly changing the groove width ratio.

The hydrodynamic bearing device according to the fourth aspect of the present invention is such that in the first aspect, the pressure generating grooves have a herringbone shape.

The hydrodynamic bearing device according to the fifth aspect of the present invention is such that in the first aspect, the fluid is a gas.

With this structure, the same effects as those described above can be attained even if the fluid is compressible.

BEST MODE FOR CARRYING OUT THE INVENTION

Embodiments of the present invention will now be described using FIGS. 1 to 4.

Elements constituting the same structure as in FIG. 5, which depicts a conventional example, will be described using the same symbols.

Figure 5:
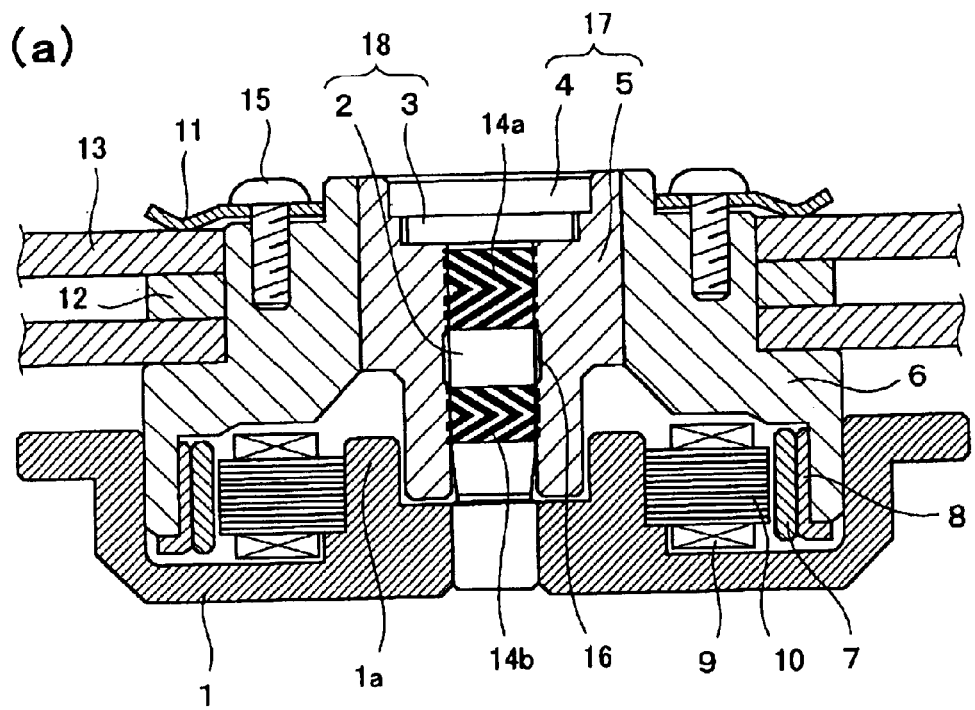
FIG. 5 is a cross-sectional view of a spindle motor for a hard disk drive with a conventional hydrodynamic bearing device.
Figure 5:
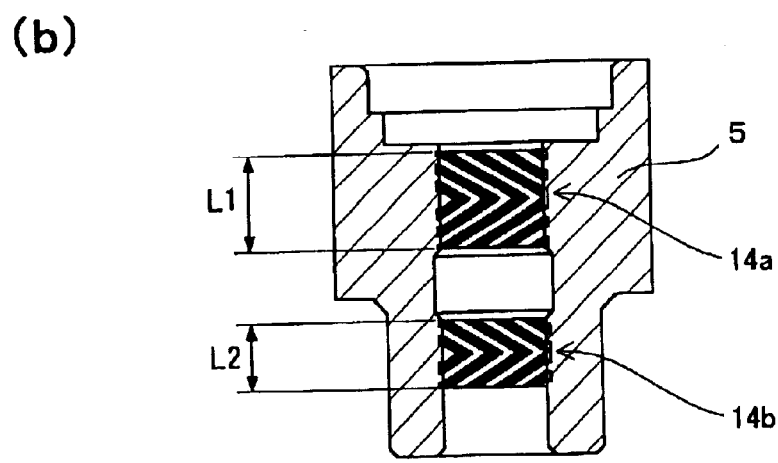

Whereas the hydrodynamic bearing device shown in FIG. 5 is configured such that the bearing length L1 of the radial bearing portion 14a is set greater than the bearing length L2 of the radial bearing portion 14b, that the bearing stiffness is varied, and that balance is established in relation to the center of gravity position G of the rotating body, the present embodiment has an additional feature such that the radial bearing portions 14a and 14b are provided with a special structure and that a complete or substantially complete match is established between the corresponding eccentric angles, as shown in FIGS. 1(a) to 1(c).

The eccentric angles of the radial bearing portions 14a and 14b are the angles between the force exerted on the sleeve 5 by dynamic pressure and the position in which the gap between the external peripheral surface of the shaft 2 and the internal peripheral surface of the sleeve 5 during rotation is at its minimum, and a substantially complete match can be established between the eccentric angles of all the radial bearing portions by employing any of the hereinbelow described structures (1) to (3), or a combination of a plurality thereof.

(1) The pressure generating grooves 15a and 15b in the radial bearing portions 14a and 14b have different groove angles $\theta 1$ and $\theta 2$. As used herein, "groove angles $\theta 1$ and $\theta 2$" refer to the angles between the radial direction of the shaft 2 and the pressure generating grooves 15a and 15b.

(2) The pressure generating grooves 15a and 15b in the radial bearing portions 14a and 14b have different groove depths d1 and d2. In particular, the groove depth d2 of the radial bearing portion 14b with a smaller bearing length should be made smaller than the groove depth d1 of the radial bearing portion 14a with a greater bearing length.

(3) The groove width ratio of the radial bearing portion 14b with a smaller bearing length is made smaller than the groove width ratio of the radial bearing portion 14a with a greater bearing length. As used herein, "groove width ratio" refers to the ratio [a/(a+b)] of the groove width a in relation to the sum (a+b) of the groove width a and ridge width b.

In a plurality of radial bearing portions whose bearing lengths differ in this manner, the inclination between the center line of the shaft 2 and the center line of the sleeve 5 can be reduced, the rotational precision improved, and NRRO minimized by employing a structure in which all the eccentric angle substantially match each other.

A specific example will now be described.

In a hydrodynamic bearing device configured in the same manner as in FIG. 5, the diameter of the shaft 2 is set to 3 mm, and the radial distance between the sleeve 5 and the shaft 2 at the formation position of the radial bearing portions 14a and 14b is set to 3 $\mu$m. In addition, the bearing lengths L1 and L2 of the radial bearing portions 14a and 14b are set with consideration for the balance between bearing rigidity and the center of gravity position G of the rotating body, such that L1=3.0 mm and L2=2.5 mm.

In the hydrodynamic bearing device thus designed, the following settings are selected in accordance with conventional practice, taking into account bearing rigidity and rotational stability: a groove angle of 30°, a groove depth of 3.5 $\mu$m, a groove width ratio of 0.5, and an arcuate shape for the cross section of the groove.

In the present embodiment, the groove shape of the pressure generating grooves 15a and 15b are varied in the following manner because the eccentric angles do not match if the pressure generating grooves 15a and 15b, which constitute the radial bearing portions 14a and 14b, have the same groove shape.

Figure 1:
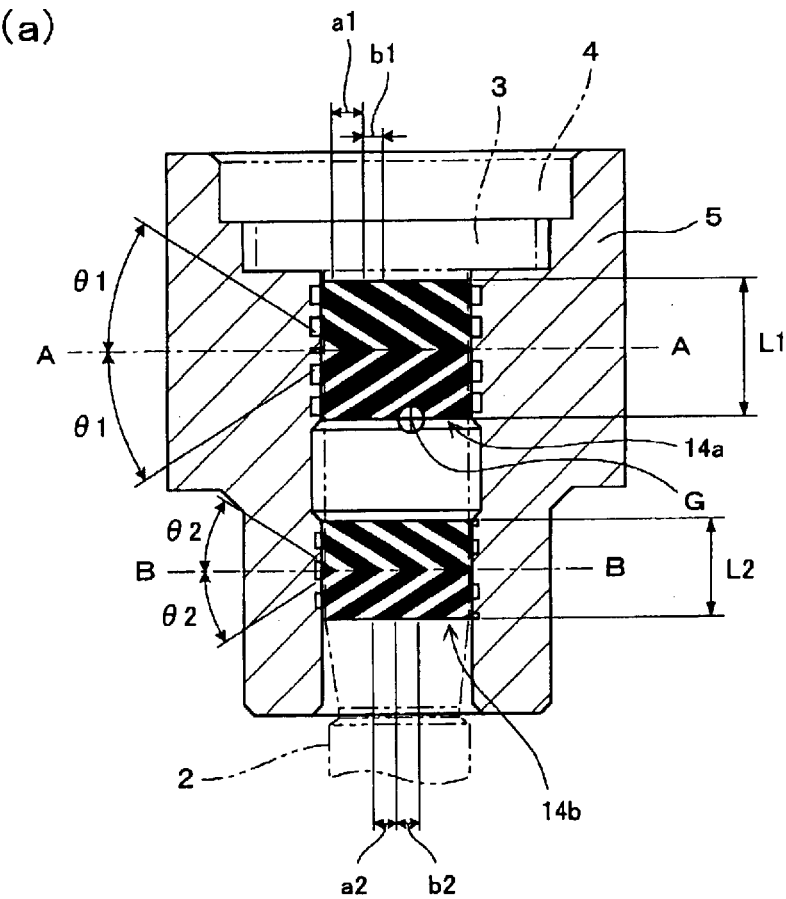
FIG. 1 is a fragmentary enlarged cross-sectional view of a hydrodynamic bearing device according to an embodiment of the present invention, and fragmentary enlarged plan views of a sleeve along lines A—A and B—B.
Figure 1:
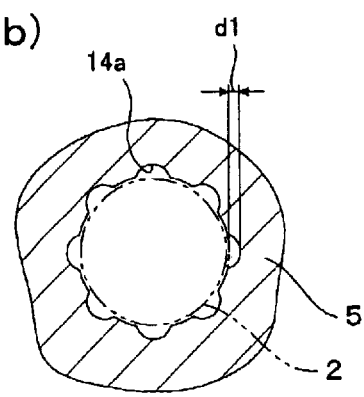
Figure 1:
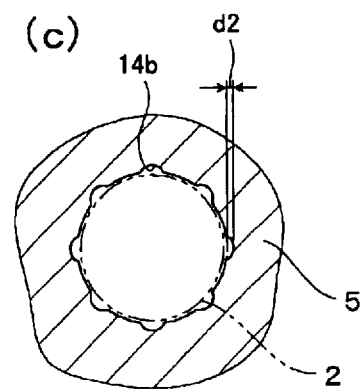
Figure 2:
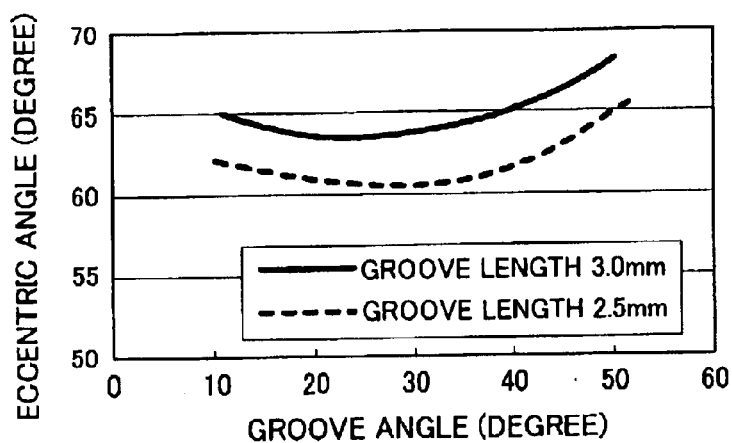
FIG. 2 is a diagram depicting a relation between eccentric angles and groove angles of radial bearing portions according to the same embodiment.

First, the groove angles $\theta 1$ and $\theta 2$ are varied, and the relation between the groove angles and eccentric angles is measured. FIG. 2 shows results obtained by subjecting an incompressible Navier-Stokes equation to numerical analysis. The groove angle $\theta 2$ of the radial bearing portion 14b with a smaller bearing length L2 should be set to about 45° if it is assumed that the groove angle $\theta 1$ of the radial bearing portion 14a with a greater bearing length L1 is the same as in the conventional example (30°). In this case, the bearing length L2 may remain at 2.5 mm because the bearing rigidity of the radial bearing portion 14b changes only slightly.

Figure 3:
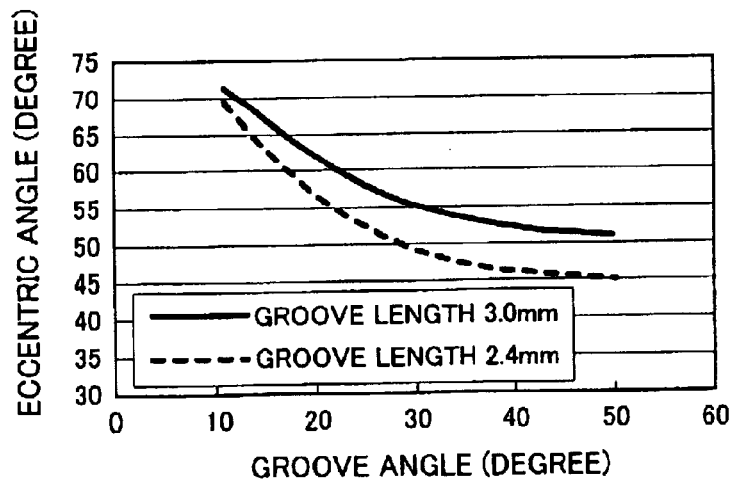
FIG. 3 is a diagram depicting a relation between eccentric angles and groove depths of the radial bearing portions according to the same embodiment.

Next, the groove depths d1 and d2 are varied, and the relation between the groove depths and eccentric angles is measured. In FIG. 3, which shows results obtained by subjecting an incompressible Navier-Stokes equation to numerical analysis, the eccentric angle decreases with increased groove depth. The groove depth d2 of the radial bearing portion 14b with a smaller bearing length should therefore be kept below 3.5 μm, assuming that the groove depth d1 of the radial bearing portion 14a with a greater bearing length is the same as in the conventional example (3.5 μm). However, the bearing length L2 can be reduced because bearing rigidity increases with reduced groove depth. Taking these facts into account, it is possible to bring the eccentric angles of the upper and lower radial bearing portions 14a and 14b to substantially the same level by setting the bearing length L2 of the radial bearing portion 14b with a smaller bearing length to 2.4 mm, and the groove depth to 3.0 μm.

Figure 4:
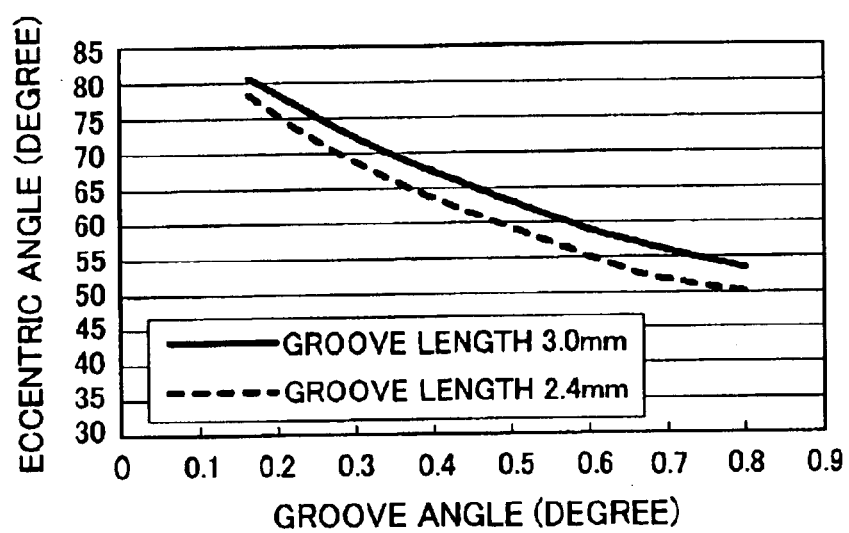
FIG. 4 is a diagram depicting a relation between eccentric width ratios and groove depths of the radial bearing portions according to the same embodiment.

Furthermore, the groove width ratios [a/(a+b)] alone are varied, and the relation between the groove width ratios and eccentric angles is measured. In FIG. 4, which shows results obtained by subjecting an incompressible Navier-Stokes equation to numerical analysis, the eccentric angle decreases with increased groove width ratio.

The groove width ratio [a2/(a2+b2)] of the radial bearing portion 14b with a smaller bearing length should therefore be kept below 0.5, assuming that the groove width ratio [a1/(a1+b1)] of the radial bearing portion 14a with a greater bearing length is the same as in the conventional example (0.5). However, the bearing length L2 can be reduced because bearing rigidity increases with reduced groove width ratio. Taking these facts into account, it is possible to bring the eccentric angles of the upper and lower radial bearing portions 14a and 14b to substantially the same level by setting the bearing length L2 of the radial bearing portion 14b with a smaller bearing length to 2.4 mm, and the groove width ratio to 0.4.

The eccentric angles can thus be determined by preliminary experimentation or numerical analysis, making it possible to set the detailed dimensions of the herringbone-shaped pressure generating grooves constituting the radial bearing portions 14a and 14b. As a result, the inclination between the center line of the shaft 2 and the center line of the sleeve 5 during rotation can be reduced, and the rotational precision improved in the radial bearing portions 14a and 14b with the different bearing lengths L1 and L2 by varying at least one parameter selected from the groove angles θ1 and θ2, groove depths d1 and d2, and groove width ratios of the pressure generating grooves 15a and 15b, and ensuring a substantially perfect match between the corresponding eccentric angles.

The above description was given with reference to an example in which pressure generating grooves 15a and 15b were formed in the internal peripheral surface of a sleeve 5 to obtain radial bearing portions 14a and 14b, but the present invention is not limited to this option alone and allows the pressure generating grooves to be formed in the external peripheral surface of the shaft 2, or in both the internal peripheral surface of the sleeve 5 and the external peripheral surface of the shaft 2.

In addition, the above description was given with reference to an example in which two radial bearing portions were provided, but the present invention is not limited to this option alone and allows more than two such portions to be provided.

Another feature of the above description is that the pressure generating grooves formed in the radial bearing portions are shaped as herringbones that are horizontally symmetrical in the central curved portions thereof, but the present invention is not limited to this option alone and may involve herringbone shapes that are asymmetrical in relation to the central curved portions thereof, or grooves that have spiral shapes or that have split, sloped shapes.

Furthermore, the above description was given with reference to an example in which a fluid was incompressible oil, but the present invention is not limited to this option alone and also allows water or another liquid to be used, or a variable-density gas such as air to be used.

Moreover, the number of the radial bearing portions, the shape of the pressure generating grooves, and the like can be appropriately selected depending on the shape and size of the shaft 2 and sleeve 5, and are not limited by the present embodiment.

Thus, according to the hydrodynamic bearing device of the present invention, there is provided a hydrodynamic bearing device in which the fluid is interposed between a bearing unit and an axle supported in rotatable fashion in relation to each other, pressure generating grooves are formed on at least either the external peripheral surface of the axle or the internal peripheral surface of the bearing unit, and a plurality of radial bearing portions whose bearing length varies in the axial direction is provided, wherein at least one parameter selected from among the groove depths of the pressure generating grooves constituting the radial bearing portions, the groove angles constituting the angles between the grooves and the radial direction of the axle, and the groove width ratios [a/(a+b)] constituting the ratios of the groove width a in relation to the sum (a+b) of the groove width a and ridge width b is caused to vary among the plurality of radial bearing portions, whereby the system can rotate without any inclination between the center line of the axle and the center line of the bearing unit during rotation, making it possible to improve rotational precision and to reduce NRRO.

What is claimed is:

1. A hydrodynamic bearing device, comprising:

a sleeve and a shaft rotatably located around a common axis, said axis defining an axial direction;

fluid interposed between said sleeve and shaft;

a plurality of bearing portions extending along the axial direction of at least one of an external peripheral surface of the shaft or an internal peripheral surface of the sleeve, each bearing portion having a different bearing length in the axial direction; and said plurality of bearing portions having pressure generating grooves, each groove having a depth, each bearing portion having a different groove depth.

2. The hydrodynamic bearing device according to claim 1, wherein said plurality of radial bearing portions comprises a first bearing portion having a first length and a first groove depth and a second bearing portion having a second length and a second groove depth, said first length being greater than said second length and the first groove depth being greater than the second groove depth.

3. The hydrodynamic bearing device according to claim 1, wherein the fluid comprises a gas.

4. The hydrodynamic bearing device according to claim 1, wherein the pressure generating grooves comprise a herringbone shape.

5. A hydrodynamic bearing device, comprising:

a sleeve and a shaft rotatably located around a common axis, said axis defining an axial direction;

fluid interposed between said sleeve and shaft;

a plurality of bearing portions extending along the axial direction of at least one of an external peripheral surface of the shaft or an internal peripheral surface of the sleeve, each bearing portion having a different bearing length in the axial direction; and said plurality of bearing portions having pressure generating grooves in at least one of said surfaces, each groove having a width A, and being separated from an adjacent groove by a ridge having a width B, each portion having a different groove width ratio A/(A+B).

6. The hydrodynamic bearing device according to claim 5, wherein the fluid comprises a gas.

7. The hydrodynamic bearing device according to claim 5, wherein said plurality of radial bearing portions comprises a first bearing portion having a first length and a first groove width ratio and a second bearing portion having a second length and a second groove width ratio, said first length being greater than said second length and said first groove width ratio being greater than said second groove width ratio.

8. The hydrodynamic bearing device according to claim 5, wherein the pressure generating grooves comprise a herringbone pattern.

9. A hydrodynamic bearing device, comprising:

a sleeve and a shaft rotatably located around a common axis, said axis defining an axial direction;

fluid interposed between said sleeve and shaft;

a plurality of bearing portions extending along the axial direction of at least one of an external peripheral surface of the shaft or an internal peripheral surface of the sleeve;

said plurality of bearing portions having pressure generating grooves in at least one of said surfaces, each groove having a groove angle between the groove and a radial plane intersecting the shaft; and said plurality of bearing portions comprising a first bearing portion having a first length and a first groove angle and a second bearing portion having a second length and a second groove angle, said first length being greater than said second length and said first groove angle being smaller than said second groove angle.

10. The hydrodynamic bearing device according to claim 9, wherein the fluid comprises a gas.

11. The hydrodynamic bearing device according to claim 9, wherein the pressure generating grooves comprise a herringbone pattern.

* * * * *

UNITED STATES PATENT AND TRADEMARK OFFICE
CERTIFICATE OF CORRECTION

PATENT NO. : 6,877,902 B2
DATED : April 12, 2005
INVENTOR(S) : Taizou Ikegawa

It is certified that error appears in the above-identified patent and that said Letters Patent is hereby corrected as shown below:

<u>Title page,</u>
Insert Item: -- [30]  Foreign Application Priority Data
  May 30, 2001  (JP) .... 2001-161520 --.

Signed and Sealed this

Twenty-first Day of March, 2006

JON W. DUDAS
*Director of the United States Patent and Trademark Office*